April 28, 1959  C. E. NORTON  2,883,884
DIFFERENTIAL
Filed Aug. 23, 1956  4 Sheets-Sheet 1
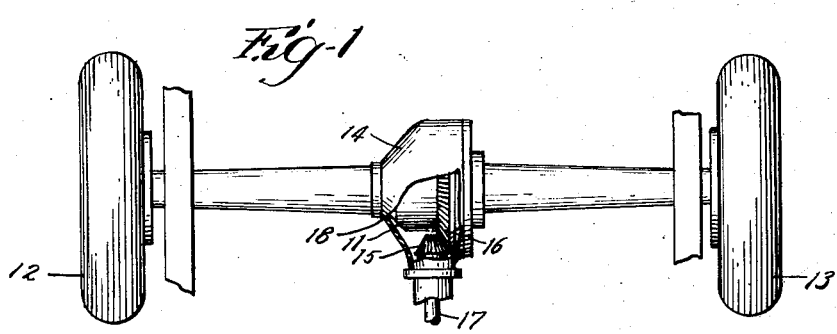
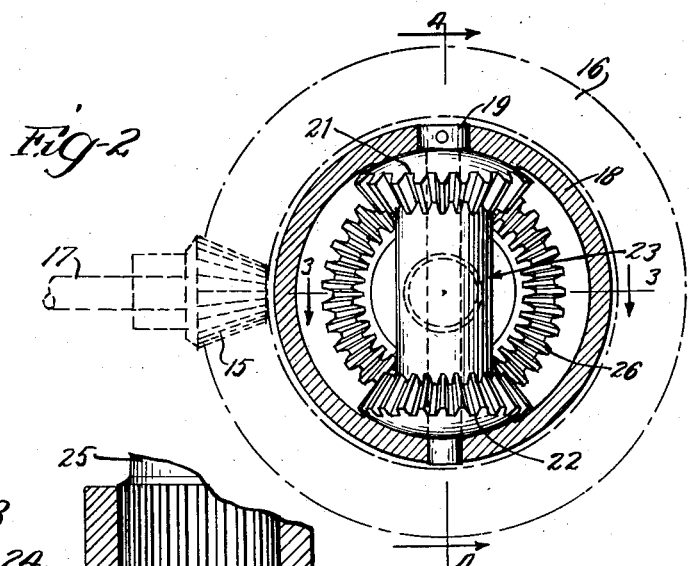
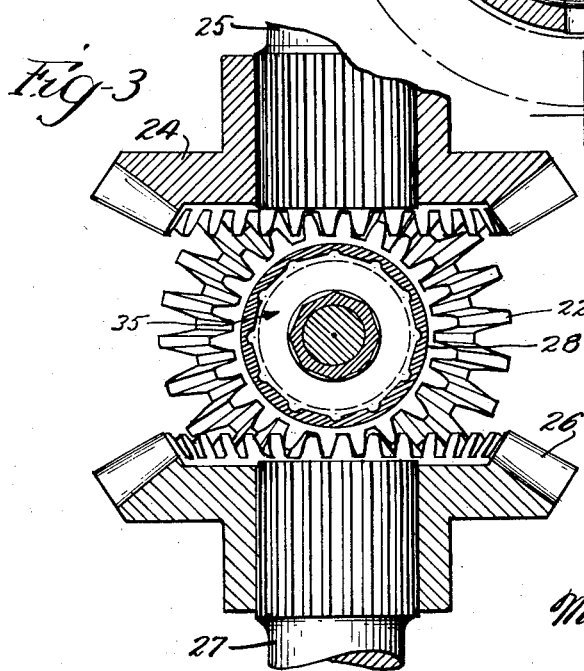
INVENTOR.
Charles E. Norton
BY
Mann, Brown & McWilliams
Attys.

INVENTOR.
Charles E. Norton
BY
Mann, Brown & McWilliams
Attys.

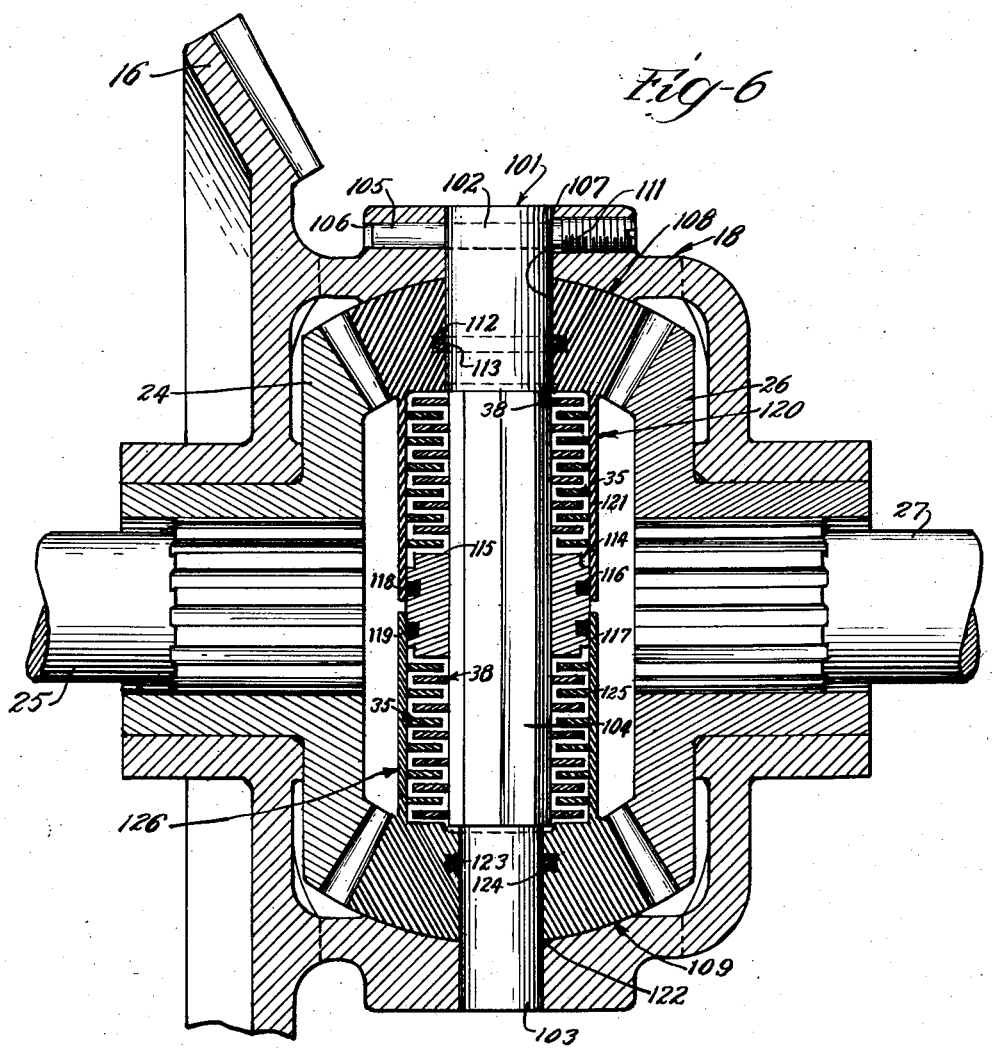

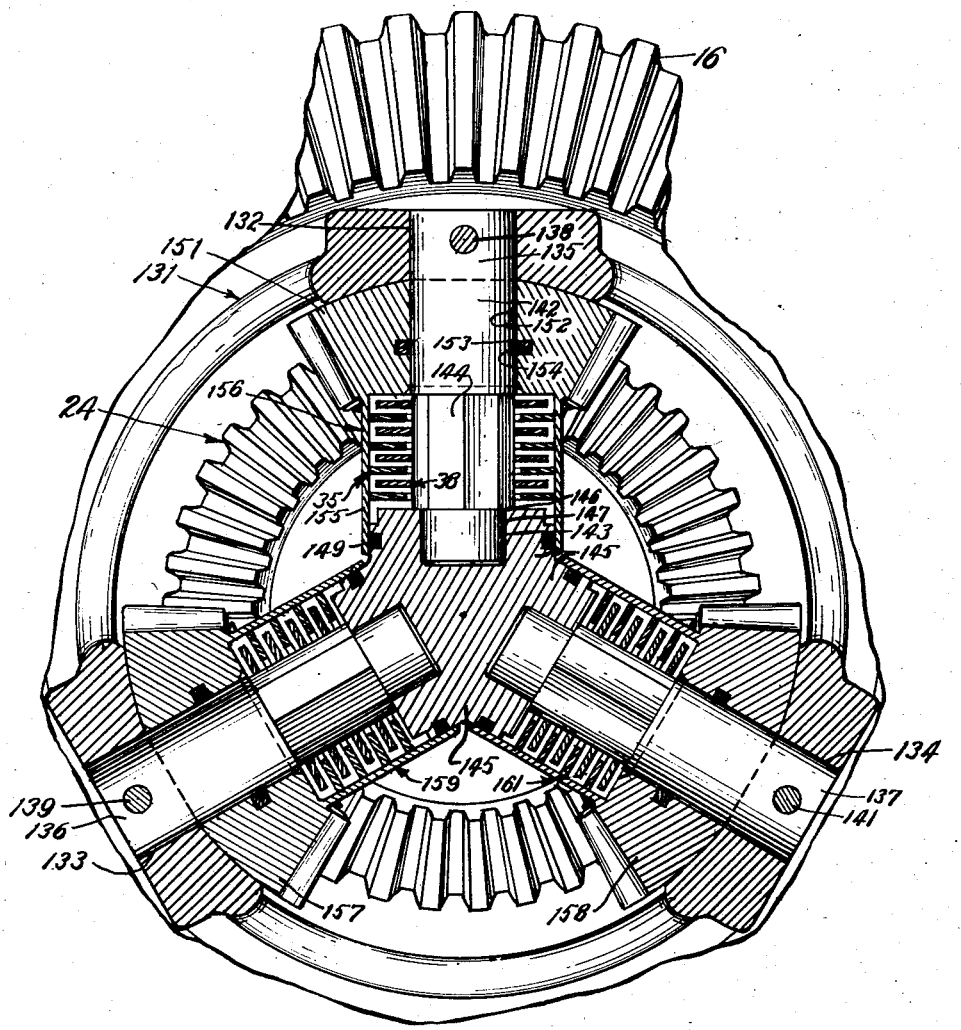

United States Patent Office 2,883,884
Patented Apr. 28, 1959

2,883,884

DIFFERENTIAL

Charles E. Norton, Highland Park, Ill.

Application August 23, 1956, Serial No. 605,875

4 Claims. (Cl. 74—711)

This invention relates to automotive differentials, and more particularly, to that type of differential that performs its normal function of supplying an equal torque to both wheels under normal operating conditions but supplies an increased torque to one of the rear wheels under extraordinary conditions.

In the ordinary operation of an automotive vehicle, the differential performs the highly beneficial function of providing an equal amount of torque to both rear wheels. However, the beneficial feature may become quite undesirable under certain circumstances. Most drivers of motor vehicles have had the experience of having one wheel stuck in a mud hole or snow bank while the other wheel remained on solid ground. The drivers have at that time had the feeling of frustration when the wheel in the mud hole or snow bank spun around while the other wheel solidly remained unmoved, as did the vehicle. The principal purpose of the instant invention is to provide an increased torque to the wheel on solid ground whenever the opposite wheel starts to spin because of poor traction.

Other objects of the instant invention are: to provide an improved differential that automatically increases the amount of torque to one wheel when the opposite wheel spins on a low traction surface; to provide a mechanism which may, in many instances, be readily incorporated in present differentials; and to provide a differential embodying these desirable features which may be produced at low cost.

Other objects and advantages will be readily understood from the following specification upon reference to the accompanying drawings in which:

Figure 1 shows the relative position of a differential in connection with a pair of wheels and a cut away portion in the differential housing showing the engagement of a drive gear with a ring gear which is connected to a differential case;

Figure 2 is a cross sectional view through the differential case showing a pair of differential pinions rotatably mounted in the case with a fluid clutch connecting the differential pinions;

Figure 3 is a cross sectional view taken on line 3—3 of Figure 2 showing the interior of the fluid clutch connecting the differential pinions;

Figure 6 is a cross sectional view showing two differential pinions with a fluid clutch attached to each; and Figure 7 is a cross sectional view through a differential casing showing three differential pinions with a fluid clutch attached to each and a cross sectional view through one of said fluid clutches.

Figure 4:
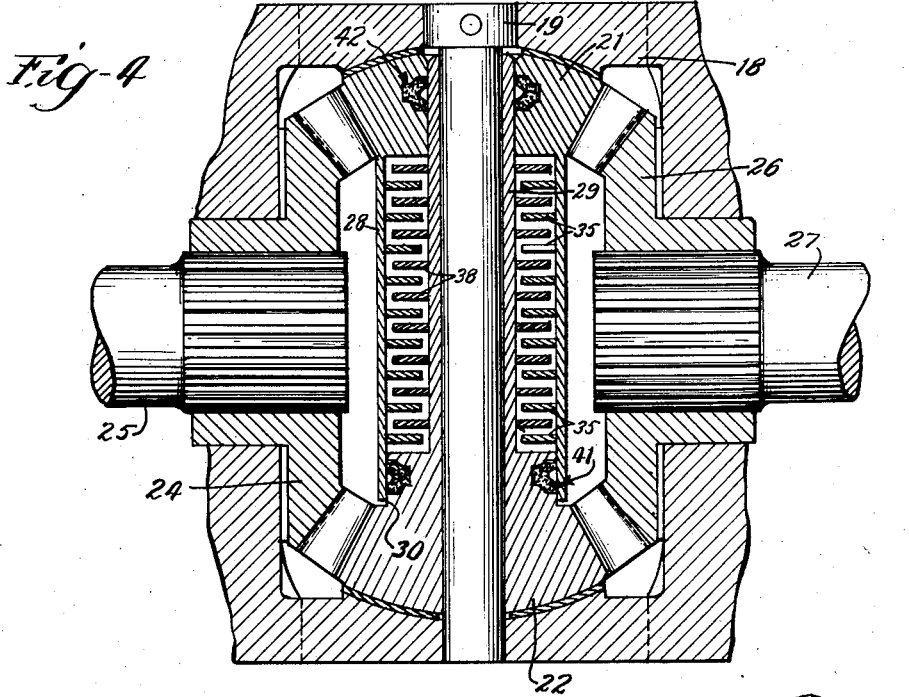
Figure 4 is a cross sectional view taken on line 4—4 of Figure 2 showing the fluid clutch with the thickness of the discs or rings and the spaces between the discs exaggerated for purposes of illustration.

Referring first to Figure 1, there is shown an illustration of the ordinary disposition of parts in an automotive vehicle rear end wherein a differential 11 is interposed between a pair of rear wheels 12 and 13. A differential housing 14 encases the mechanism and is shown cut away to show drive gear 15 engaging ring gear 16. The drive gear 15 is connected to drive shaft 17 which in turn is connected to the source of power for the vehicle.

Attached to ring gear 16 is a differential case 18 and fixed in the case is a differential pinion shaft 19 shown in Figure 2. Rotatably mounted near one end of the differential pinion shaft is a differential pinion 21. Mounted near the other end of said shaft is a differential pinion 22 and connecting the differential pinions 21 and 22 is a fluid clutch, generally designated 23. Each of the differential pinions mesh with a differential gear 24 which is splined to live axle 25 that connects gear 24 to rear wheel 12. The differential pinions also mesh with a differential gear 26 which has live axle 27 splined therein and the center line of live axle 27 coincides with the center line of live axle 25. The live axle 27 connects differential gear 26 to rear wheel 13.

Figure 5:
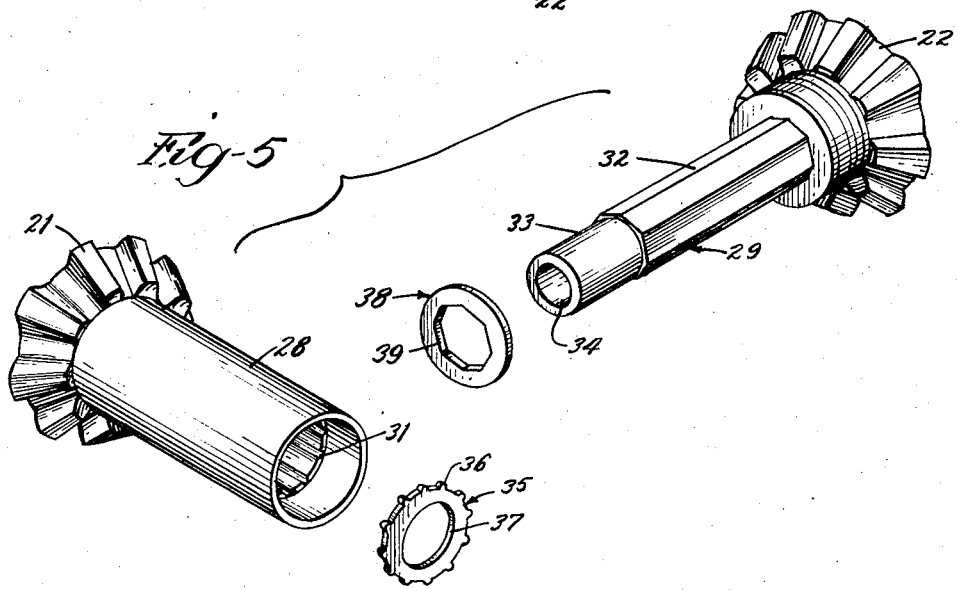
Figure 5 is an exploded view of the fluid clutch showing one of each type of disc therein.

One embodiment of the invention is shown in Figures 4 and 5. An outer casing or sleeve member 28 having a diameter less than either pinion 21 or 22 is fixed to pinion 21 and an inner casing 29 is fixed to pinion 22. As shown in Figure 4, the casing or shaft member 28 extends from pinion 21 to rotatably engage an annular shoulder 30 on the pinion 22. The inner surface of the outer casing is splined in that it has a plurality of linear grooves 31 extending parallel to the axis of the casing as shown in Figure 5 while the outer surface is smooth. Inner casing 29 is splined in that it has a polygonal surface 32 (in this instance, octagonal) immediately adjacent the pinion 22 while the extreme outer portion 33 is smooth and freely fits in pinion 21. Inner housing 29 has a bore 34 extending the entire length of the casing through which rotatably fits the differential pinion shaft 19.

A multiplicity of metallic discs or rings 35, the outer peripheries of which are complementary to and register with the inner surface of casing 28, are positioned in said casing. These discs 35 (which for convenience will be termed "outer discs" since they are drivingly connected to and rotate with the outer casing 28) have a plurality of ridges or knobs 36 on their outer edges and circular holes 37 having a diameter slightly greater than the diameter of the circumscribed circle for the octagonal portion 32 on inner casing 29, so that the outer discs are free to rotate on the portion 32 of inner casing 29.

A plurality of metallic discs 38 also fit inside the outer casing 28, and for convenience these will be termed "inner discs" as they are drivingly connected to and rotate with the inner casing 29. The inner discs have an outer edge which is circular in form with a diameter of less than the inside diameter of the casing 28 so that they may rotate with respect to the inner surface of outer casing 28. The discs 38 have an octagonal hole 39 which is of a size and shape that registers with the octagonal portion 32 on inner casing 29.

The pinions 21 and 22 are assembled in the differential casing 18, as shown in Figure 4, so that the outer casing 28 is telescopically received on the annular shoulder 30 of the differential pinion 22 and a suitable seal 41 is placed therebetween to create a liquid tight junction. The seal may consist of a resilient O-ring, or a double-lipped ring of appropriate material. The rounded portion 33 of inner casing 29 rotates freely within pinion 21 and a second oil seal 42 between the casing 29 and pinion 21 creates a fluid tight seal between the two relatively rotatable parts to define a liquid chamber therebetween. The inner and outer discs 38 and 35 are alternately positioned in the chamber formed by inner and outer casings 28 and 29 as shown in Figure 4. However, it must be borne in mind that Figure 4 is but a diagrammatic representation and the size of the parts and the spacings have been exaggerated for the sake of clarity. The actual distance between the discs is just sufficient to accommodate a liquid film between the discs, say on the order of four or five thousandths of an inch, but the spacing may be varied in relation to the viscosity of the fluid chosen.

In addition to the discs, a viscous fluid is contained in the chamber to form a film on the surface of each of the discs. The viscous fluid may be glycerine or any other suitable material that retains its rated viscosity over a wide range of temperatures, and I prefer to use a heavy silicone such as Dow Corning's 200 Fluid, as it appears to have the desired qualities.

Although Figures 2 through 5 show embodiments of the instant invention with one fluid clutch between a pair of differential pinions, the scope of this invention encompasses the use of more than one fluid clutch in a differential. Figure 6 shows a pair of fluid clutches between two differential pinions while Figure 7 shows three differential pinions with a fluid clutch attached to each of said pinions.

Referring now specifically to Figure 6, a differential case 18 which is identical to the case 18 described above has a ring gear 16 welded thereto. Of course, the ring gear 16 may be attached to the case 18 by means of screws, or machine bolts, or any other convenient method of fastening two pieces of metal. Rotatably mounted in the casing is a pair of differential gears 24 and 26. The differential gears are identical to those mentioned above, and a pair of live axles 25 and 27 are splined to the differential gears 24 and 26, respectively.

Non-rotatably mounted in differential casing 18 is an octagonal differential pinion shaft 101. The shaft 101 has an upper portion 102 that has a circular cross section and a lower portion 103 that has a circular cross section but of a diameter less than that of portion 102. The intermediate portion of the shaft 101 is octagonal in cross section. This octagonal section 104 is slightly smaller than the octagonal hole 39 described in conjunction with inner discs 38 for reasons that will be indicated below. A pin 105 in hole 106 of case 18 passes through hole 107 of shaft 101 to position the shaft 101 securely in differential casing 18.

Rotatably mounted on the upper portion 102 of shaft 101 is a differential pinion 108. The differential pinion 108 meshes with differential gears 24 and 26. Rotatably mounted on the lower portion 103 of shaft 101 is a second differential pinion 109. The differential pinion 109 also meshes with differential gears 24 and 26.

Differential pinion 108 has a hole 111 in the center of said pinion. The hole 111 is slightly greater than the diameter of the upper portion 102 to provide a free fit between the pinion 108 and shaft 101. A groove 112 in a side wall of hole 111 provides a space to receive an O-ring 113. The O-ring 113 coacts with upper portion 102 to form a fluid tight seal between shaft 101 and differential pinion 108. It must be observed that any suitable type of fluid seal may be used to form a fluid tight junction between the differential gear and the shaft 101.

A seal holder 114 has an octagonal hole 115 in the central portion thereof. The octagonal hole 115 registers with the octagonal portion 104 of shaft 101 and the outer periphery of the seal holder is circular in cross section. A groove 116 is positioned near one edge of the seal holder and a second groove 117 is positioned near the opposite end thereof. An O-ring 118 is positioned in the groove 116 and a second O-ring 119 is positioned in groove 117.

An outer casing or housing 121, which is identical in cross section to the above described outer casing 28, is fixed to differential pinion 108. In this instance, the outer casing 121 is brazed to the differential pinion. However, any suitable method of fixing the outer casing to the differential pinion may be used. The free end of casing 121 rotatably engages the seal holder 114, and O-ring 118 coacts with seal holder 114 and outer casing 121 to form a fluid tight junction between the two parts. As a result, the volume formed by seal holder 114, outer casing 121, differential pinion 108, and shaft 102 is a fluid tight container.

Non-rotatably mounted on the octagonal portion 104 between the differential pinion 108 and seal holder 114 is a set of inner discs 38 identical to those that have been described above. A second set of discs, outer discs 35, which have been described above, are nonrotatably mounted in outer casing 121 and interspaced between the first mentioned inner discs 38.

To complete fluid clutch 120, a viscous fluid which has been described above, Dow Corning 200 Fluid, is contained between the discs 35 and 38, though any other suitable fluid may be used.

Turning now to differential pinion 109, this pinion has a hole 122 in the central portion thereof, and the hole 122 is of a slightly greater diameter than the diameter of lower portion 103 so that there may be a free fit between differential pinion 109 and said lower portion 103. A groove 123 in hole 222 contains an O-ring 124 to form a fluid tight junction between the differential pinion 109 and shaft 101.

A second outer casing or housing 125 is attached to differential pinion 109 by means of brazing although any other method may be used to attach the outer casing 125 to differential pinion 109 as long as a fluid tight junction between said parts results. The cross section of outer casing 125 is identical to that of outer casing 121 and the face end of the casing freely fits on seal holder 114 so that O-ring 119 forms a fluid tight junction between the outer casing 125 and seal holder 114.

Outer discs 35 are non-rotatably mounted in casing 125 between seal holder 114 and differential pinion 109 and a set of inner discs 38 are non-rotatably mounted on the octagonal portion 104 interspaced the set of outer discs 35.

As in the above described fluid clutch 120, the same Dow Corning 200 Fluid is contained between the second mentioned sets of discs to form fluid clutch 126 attached to differential pinion 109.

Turning now to Figure 7, ring gear 16 is attached to differential case 131 in the same manner as ring gear 16 was attached to differential case 18. The differential case 131 has equidistant holes 132, 133, and 134 in its outer periphery and mounted in each of said holes are octagonal differential pinion shafts 135, 136, and 137, respectively. Shaft 135 is held in casing 131 by pin 138 as are shafts 136 and 137 by pins 139, and 141, respectively.

Shaft 135 has an enlarged end 142 having a circular cross section and a smaller end 143 also having a circular cross section but the diameter of end 143 is less than that of end 142. Intermediate the two ends is an octagonal portion 144 having an outer configuration identical to portion 32 of inner casing 29.

A spider 145 has one side 146 with a hole 147 therein. The diameter of hole 147 is slightly greater than the outside diameter of end 143 so that there may be a free fit between end 143 of shaft 135 and spider 145. The outer periphery of the spider near end 146 is circular in cross section and a groove 148 near said end contains an O-ring 149.

A differential pinion 151 having a hole 152 in the central portion thereof is rotatably mounted on shaft 135. The diameter of hole 152 is slightly greater than the upper portion 142 of the shaft so that there is a free fit between the pinion and shaft. Inside of hole 152 is a groove 153 containing an O-ring 154 which makes a fluid tight seal between pinion 151 and shaft 153.

The differential pinion 151 meshes with differential gear 24 which is shown and a second differential gear which is not shown.

Brazed to differential pinion 151 is an outer casing or housing 155 that has a cross section identical to outer casing 28. The free end of casing 155 rotatably engages the spider and O-ring 149 forms a fluid tight seal between the casing and spider.

Non-rotatably mounted in casing 155 are outer discs 35 between the differential pinion 151 and the spider. Alternately spaced between the discs 35 is a second set of discs, namely, inner discs 38 which are non-rotatably mounted on the octagonal portion 144 of shaft 135. A viscous fluid is contained within the outer casing 155 between discs 35 and 38 to form a fluid clutch 156. In this instance, Dow Corning 200 Fluid is used but any suitable viscous fluid may be used as was described above.

Differential pinions 157 and 158 are rotatably mounted on shafts 136 and 137, respectively, in the same manner that differential pinion 151 is mounted on shaft 135. Connecting spider 145 to differential pinions 157 and 158 are fluid clutches 159 and 161, respectively. The fluid clutches 159 and 161 are identical to the above described fluid clutch 156.

Although it is shown in Figure 7 that each of the differential pinions has a fluid clutch attached thereto, it is possible to eliminate either one or two of the fluid clutches, and my invention would still be operative. Furthermore, it may easily be seen that by using a spider, any number of differential pinions may be used, and of course, any number of fluid clutches may be used with the differential pinions.

In essence, the fluid clutches in all embodiments of the invention, operate the same.

In the ordinary operation of a motor vehicle in straight line driving, the engine transmits power through the drive shaft 17 to drive gear 15 (Figure 1). The drive gear 15 rotates ring gear 16 which is attached to differential casing 18. The rotation of differential casing 18 also rotates the differential pinions 21 and 22 and the rotation of the differential pinions turns the drive gears 24 and 26 which in turn rotate wheels 12 and 13 through axles 25 and 27.

The fluid clutch 23 does not come into operation in ordinary straight line driving because the torque applied to wheels 12 and 13 is equal.

However, when one of wheels, for instance wheel 13, falls into a mud hole or it is stuck in a snow bank where the coefficient of friction between the wheel and supporting surface is quite low, and added traction is needed to move the vehicle while wheel 12 is on a solid surface, such as concrete, where the coefficient of friction between the wheel and the supporting concrete surface is high, the drive shaft 17 rotates drive gear 15 which in turn rotates ring gear 16 and thus rotates casing 18 which is attached to the ring gear. The rotation of casing 18 carries with it the differential pinions 21 and 22. Because the torque required to turn the wheel 13 is substantially less than the torque required to turn rear wheel 12, differential gear 26 turns quite readily while differential gear 24 remains stationary. This situation results in differential pinions 21 and 22 rotating about the same axis in different directions. As differential pinion 21 rotates in one direction, it carries with it outer casing 28 which in turn rotates outer discs 35 in the same direction. The differential pinion 22 rotates in the opposite direction and carries with it inner casing 29. Since the inner discs 38 are non-rotatably mounted on the inner casing 29, they also move in the same direction as the differential pinion 22. The result is that the alternately spaced discs move in opposite directions. The viscous fluid between the discs causes a drag to be set up between each set of discs. The drag force developed between the discs is transmitted to the stationary differential gear 24 which produces an increased torque on the differential gear. The faster the differential pinions rotate, the greater the drag force and eventually enough force is transmitted to the differential gear and to the rear wheel 12 to move the vehicle out of its predicament.

Under ordinary operating conditions very little heat is developed in the fluid clutch except in the case of a tortuous road, or when the car is stuck. Calculations are made below to show that the amount of heat generated under even the most extreme conditions is not detrimental to the differential of this invention. In order to clearly show the range of conditions considered, the attached charts show the friction moments and corresponding heats developed in the device in a vehicle making a 90 degree turn of twenty to one thousand foot radius. All of the angular accelerations are considered to be one-half g. or 16.1 ft. per second per second. It may be noted that for a given angular acceleration the frictional horsepower increases with decrease in turning radius. But the sharper turn is accomplished in a shorter time and in no case is the heat to be dissipated more than a fraction of one B.t.u. which is not considered to be highly detrimental to the particular fluid clutch. Also shown are the tractive efforts developed by the non-spinning wheel in the snow or mud situation. Together with the speed of the spinning wheel and the heat to be dissipated, the fluid frictional horsepower developed under the condition may be many times greater than in normal operation in turns. But here again the time element is very short and the total heat generated in one or two seconds is of the order of 1 to 10 B.t.u.'s which is not considered detrimental.

The quantity of heat can be reduced by a different choice of dimensions or by the selection of a more viscous fluid but only at the expense of increasing the very small amount of heat generated in normal operation in turns. Below are the calculations made for a typical fluid disc clutch in which the following conditions were assumed:

$\mu$=Fluid viscosity=31,000 centipoises=.0045 Reyn. ($\mu_1$).
$C$=Film thickness=.002 inches.
Discs: 36 Pairs, 1¼" O.D. x ¾" I.D.
Rear tires: Approx. 28" O.D.=720 revolutions per mile.
Differential ratio=Diff. gear÷diff. pinion=18/12=1.5.
Tread=Center line to center line of rear tires=5 feet.
½ $g$=16.087 feet per second per second=allowable angular acceleration.
$R_F$=Radius of turn (to center line of differential), in feet=20 to 1000.
$V$=Car speed (at center line of differential), in feet per second.
$V_1$=Car speed (at center line of differential) in m.p.h.
$t$=Time, in seconds, to make a 90° turn.
$N/60$=Mean wheel speed, revolutions per second.
$S_d$=Difference in outer and inner wheel speeds, in revolutions per second.
$S_r$=Relative speed of two sets of discs, in revolutions per second =1.5 $S_d$.

$$V=\sqrt{1/2\ gr};\ V_1=\frac{3600}{5280}V;\ t=\pi\sqrt{\frac{r}{2g}};\ N/60=\frac{720}{5280}V$$

$$S_d=\frac{3600}{5280}\cdot\sqrt{\frac{g}{2r}}$$

in turning corners—no tire slippage.

$S_d$=.4 $V_2$, where $V_2$ is drive-shaft speedometer reading in m.p.h., when one wheel is not turning, one wheel is slipping and vehicle is not moving.
$S_r$=3/2 $S_d$ in all cases.
$M$=Moment of fluid frictional force—lb. inches.
$P$=Disc radius, varying from ⅜" at the inside to ⅝" at the outside.

$$M=72\int_{3/8}^{5/8}\frac{(2\pi P S_r \mu_1)}{C}(P)(2\pi P)dP=\frac{288\pi^2 S_r \mu_1}{C}\int_{3/8}^{5/8}P^3 dP$$
$$=\frac{72\pi^2 S_r \mu_1}{C}[(5/8)^4-(3/8)^4]=\frac{94.378 S_r \mu_1}{C}$$

$M = 212.35 S_r$, when $\mu_1 = .0045$ and $C = .002''$ Reyn.

F.F.H.P. = Fluid friction H.P. $= \dfrac{2 M S_r = .000952 M S_r}{6600} = .20216 S_r^2$ $H_m$ = Heat, in B.t.u., to be dissipated per minute
$= 42.4 \times$ F.F.H.P.

$H_{90°}$ = Heat generated in 90° turn $= .7067 \times$ F.F.H.P. $\times t$ sec.

T.E. = Tractive effort, lbs., stationary wheel.

T.E. $= \dfrac{(M)(2)(\%)}{14} = .2142 M$

OPERATION: WITH 1 WHEEL SPINNING (NO TRACTION) 1 WHEEL STATIONARY, OR CRAWLING (WITH TRACTION) VEHICLE STATIONARY, OR CRAWLING

FLUID FRICTION $H_p$

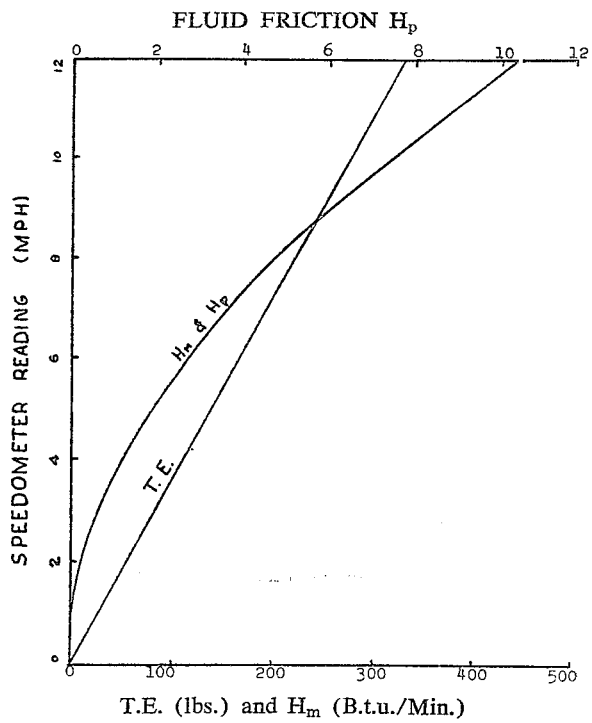

T.E. (lbs.) and $H_m$ (B.t.u./Min.)

NORMAL OPERATION IN TURNING CORNERS

M (lb.-in.)

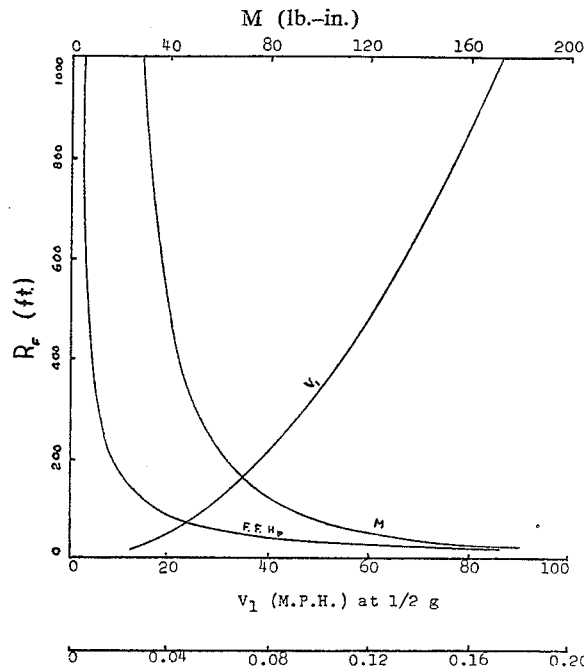

$V_1$ (M.P.H.) at 1/2 g

FLUID FRICTION HORSEPOWER

As is plainly evident from the above calculations and curves, the problem of heat in the fluid clutch in the instant invention is not of a great consequence when the vehicle makes turns under normal conditions. The calculations also show that the differential may be put under a severe strain under extraordinary conditions for a short period of time to move a vehicle out of a predicament and the differential of the instant invention would not be damaged.

Looking now to the fluid clutches shown in Figures 6 and 7, the operation of these fluid clutches is quite similar to the operation of the disc type fluid clutch described above. As in the case of the above described fluid clutch, the source of power rotates a drive shaft which turns a drive gear that meshes with ring gear 16, and thus differential case 18 rotates about the axis of live axles 25 and 27 as shown in Figure 6. The rotation of differential case 18 in a situation wherein one wheel may spin freely, results in differential pinions 108 and 109 rotating about differential pinion shaft 102. Since fluid clutches 120 and 126 in Figure 6, and fluid clutches 156, 159, and 161 in Figure 7 are identical in operation, a description of the method of operation for fluid clutch 120 will also apply to the aforementioned fluid clutches.

As differential pinion 108 rotates about shaft 102, the outer casing 121 rotates with the differential pinion. The rotation of casing 121 rotates the outer discs 35 since the discs are non-rotatably mounted in the casing. The inner discs 38 are non-rotatably mounted on octagonal portion 104 of shaft 101 so that the non-rotation of discs 38 causes a drag to be affected on outer discs 35 through the Dow Corning 200 fluid. The drag on outer discs 35 is transmitted to differential pinion 108 which then transmits the force to the non-rotating differential gear in much the same manner as was described above and thus a moving force is applied to a stuck automobile.

The operation of the differential shown in Figure 7 is quite similar to the just described method of operation. The basic difference between the differentials shown in Figures 6 and 7 from the other two embodiments is that the differential pinions may transmit a torque individually to a non-moving differential gear rather than depending upon an opposite differential pinion to provide a driving torque.

While I have shown and described two particular types of fluid clutch in my invention, it will occur to those skilled in the art that there are other fluid clutches which may be used without departing from my invention and I therefore intend in the appended claims to cover all such changes and modifications as fall within the true spirit and scope of my invention.

I claim:

1. In a differential drive for distributing torque between opposed axles deriving power therefrom, the combination of a rotatable differential case, opposed differential gears coaxially mounted in spaced apart relation within said case and connected to said opposed axles, a plurality of pinion gears journalled in said differential case and meshing with said differential gears, and means disposed in the space between said gears for yieldingly resisting relative rotation between said differential gears, said means including an axial sleeve member having an internal splined surface, and a splined shaft member telescopically received within said sleeve member, one of said members being mounted on one of said gears and the other of said members being supported from said case for rotation with respect to said one member upon differential movement between said differential gears, a plurality of intercalated rings telescopically received on said splined shaft member and fitting within said sleeve member, with alternate ones of said rings having internal surfaces drivingly connected to said splined shaft member and having an external diameter less than the internal dimension of said sleeve member, and the other intercalated rings having outer surfaces drivingly connected to the internal splined surface of said sleeve member and having an internal diameter greater than the external dimension of said splined shaft member, sealing means forming a liquid-tight connection between said splined shaft member and said sleeve member at opposite ends of said intercalated rings to form a liquid chamber in the space between said member, and a viscous liquid filling said chamber.

2. The arrangement of claim 1 wherein the gear on which the said one of said members is mounted is a pinion gear.

3. In a differential drive for distributing torque between opposed axles deriving power therefrom, the combination of a rotatable differential case, opposed differential gears coaxially mounted in spaced apart relation within said case and connected to said opposed axles, opposed differential pinions coaxially journalled in said differential case and meshing with said differential gears, and means disposed in the space between said gears for yieldingly resisting relative rotation between said differential pinions, said means including an axial sleeve secured to one of said pinions and having an internal splined surface, a splined shaft telescopically received within said sleeve and connected to said other pinion, a plurality of intercalated rings telescopically received on said splined shaft and fitting within said sleeve on said one differential pinion, with alternate ones of said rings having internal surfaces drivingly connected to said splined shaft and having an external diameter less than the internal dimension of said sleeve, and the other intercalated rings having outer surfaces drivingly connected to the internal splined surface of said sleeve and having an internal diameter greater than the external dimension of said splined shaft, sealing means forming a liquid-tight connection between said splined shaft and said sleeve at opposite ends of said intercalated rings to form a liquid chamber, and a viscous liquid filling said chamber.

4. In a differential drive for distributing torque between opposed axles deriving power therefrom, the combination of a rotatable differential case, opposed differential gears coaxially mounted in spaced apart relation within said case and connected to said opposed axles, opposed pinion gears coaxially journalled in said differential case and meshing with said differential gears, and means disposed in the space between said gears for yieldingly resisting relative rotation between said differential pinions, said means including an axial sleeve secured to one of said gears and having an internal splined surface, a splined shaft telescopically received within said sleeve and connected to the gear opposed to said one gear, a plurality of intercalated rings telescopically received on said splined shaft and fitting within said sleeve on said one gear, with alternate ones of said rings having internal surfaces drivingly connected to said splined shaft and having an external diameter less than the internal dimension of said sleeve, and the other intercalated rings having outer surfaces drivingly connected to the internal splined surface of said sleeve and having an internal diameter greater than the external dimension of said splined shaft, sealing means forming a liquid-tight connection between said splined shaft and said sleeve at opposite ends of said intercalated rings to form a liquid chamber, and a viscous liquid filling said chamber.

References Cited in the file of this patent

UNITED STATES PATENTS

| | | |
|---|---|---|
| 2,301,292 | Krick | Nov. 10, 1942 |
| 2,743,792 | Ransom | May 1, 1956 |
| 2,746,320 | Algie | May 22, 1956 |
| 2,775,141 | Ronning | Dec. 25, 1956 |

FOREIGN PATENTS

| | | |
|---|---|---|
| 430,128 | Italy | Feb. 9, 1948 |
| 708,714 | Great Britain | May 12, 1954 |

UNITED STATES PATENT OFFICE
CERTIFICATE OF CORRECTION

April 28, 1959

Patent No. 2,883,884

Charles E. Norton

It is hereby certified that error appears in the printed specification of the above numbered patent requiring correction and that the said Letters Patent should read as corrected below.

Column 2, line 24, after "casing" insert -- or shaft member --; line 25, after "casing" strike out "or shaft member".

Signed and sealed this 8th day of September 1959.

(SEAL)
Attest:

KARL H. AXLINE
Attesting Officer

ROBERT C. WATSON
Commissioner of Patents